US012681683B2

(12) United States Patent
Kitagawa et al.

(10) Patent No.: US 12,681,683 B2
(45) Date of Patent: Jul. 14, 2026

(54) CONTENT PLAYBACK DEVICE, CONTENT PLAYBACK METHOD, AND RECORDING MEDIUM

(71) Applicant: Panasonic Intellectual Property Management Co., Ltd., Osaka (JP)

(72) Inventors: Toya Kitagawa, Osaka (JP); Nobuhiko Washio, Osaka (JP); Takeshi Sakai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 169 days.

(21) Appl. No.: 18/512,347

(22) Filed: Nov. 17, 2023

(65) Prior Publication Data

US 2024/0086146 A1     Mar. 14, 2024

Related U.S. Application Data

(63) Continuation of application No. PCT/JP2022/016040, filed on Mar. 30, 2022.

(30) Foreign Application Priority Data

Jun. 1, 2021     (JP) ................................. 2021-092129
Jun. 29, 2021     (JP) ................................. 2021-108015

(51) Int. Cl.
G06F 17/00          (2019.01)
G06F 3/16          (2006.01)

(52) U.S. Cl.
CPC ................................. *G06F 3/165* (2013.01)

(58) Field of Classification Search
CPC ....................................................... G06F 3/165
(Continued)

(56) References Cited

U.S. PATENT DOCUMENTS

2009/0077160 A1*    3/2009    Svendsen ............ G06F 3/04842
                                                            715/810
2013/0111373 A1*    5/2013    Kawanishi ........... H04N 1/3873
                                                            715/762
(Continued)

FOREIGN PATENT DOCUMENTS

CN          111182448          5/2020
CN          111325249 A          6/2020
(Continued)

OTHER PUBLICATIONS

International Search Report issued Jun. 21, 2022 in International (PCT) Application No. PCT/JP2022/016040.
(Continued)

*Primary Examiner* — Paul C Mccord
(74) *Attorney, Agent, or Firm* — Wenderoth, Lind & Ponack, L.L.P.

(57) ABSTRACT

A content playback device includes: a network interface that receives the current perceived temperature information for a person in a specific area from a server via a communication network; a memory that stores the perceived temperature information and date information indicating the current date; and a central processing unit (CPU) that causes the memory to store the perceived temperature information received by the network interface, selects playback content from a plurality of pieces of content, based on the perceived temperature information and the date information, and plays back the playback content.

10 Claims, 8 Drawing Sheets

| Period | First season information | Term | Period | Season adjustment when hot | Season adjustment when cold | Season adjustment when just right |
|---|---|---|---|---|---|---|
| December – Mid January | Winter | First half | First period | Return to previous | — | Return to previous |
| Mid January – February | Winter | Latter half | Second period | Advance to subsequent | — | Advance to subsequent |
| March – May | Spring | — | Second period | Advance to subsequent | Return to previous | — |
| June – Mid July | Summer | First half | | — | Return to previous | Return to previous |
| Mid July – August | Summer | Latter half | First period | — | Advance to subsequent | Advance to subsequent |
| September – November | Autumn | — | First period | Return to previous | Advance to subsequent | — |

(58) Field of Classification Search
USPC ........................................................... 700/94
See application file for complete search history.

(56) References Cited

U.S. PATENT DOCUMENTS

| | | | | |
|---|---|---|---|---|
| 2021/0192818 A1* | 6/2021 | Unami | ................... | G06T 11/60 |
| 2021/0241321 A1* | 8/2021 | Downing | .............. | G06Q 30/02 |

FOREIGN PATENT DOCUMENTS

| | | |
|---|---|---|
| JP | 5-27048 | 2/1993 |
| JP | 2007-57271 | 3/2007 |
| JP | 2008-123576 | 5/2008 |
| JP | 2009-145785 | 7/2009 |
| JP | 2020-76684 | 5/2020 |

OTHER PUBLICATIONS

Search Report dated Mar. 31, 2026 in counterpart Chinese Patent Application No. 202280035524.7 along with English translation, 5 pages.
Wang Chuanchen et al., "Natural Seasons and Weather Types in Hangzhou Urban Area" Jul. 1991, along with English Abstract and English translation of Chapter 3, 10 pages.

* cited by examiner

FIG. 3

| Weather | Content |
|---|---|
| Rain | Rain content |
| Snow | Snow content |
| Sunny | Sunny content |

FIG. 4

| Rain content | |
|---|---|
| Precipitation | Content |
| < 5 mm | Rain content 1 |
| ≥ 5 mm and < 10 mm | Rain content 2 |
| ≥ 10  mm and < 20 mm | Rain content 3 |
| ≥ 20 mm | Rain content 4 |

FIG. 5

| Content other than rain or snow | |
|---|---|
| Season | Content |
| Spring | Spring content |
| Summer | Summer content |
| Autumn | Autumn content |
| Winter | Winter content |

| Period | First season information | Term |
|---|---|---|
| December - Mid January | Winter | First half |
| Mid January – February | | Latter half |
| March – May | Spring | — |
| June – Mid July | Summer | First half |
| Mid July – August | | Latter half |
| September – November | Autumn | — |

FIG. 10

| Period | First season information | Term | Period | Season adjustment when hot | Season adjustment when cold | Season adjustment when just right |
|---|---|---|---|---|---|---|
| December – Mid January | Winter | First half | First period | Return to previous | — | Return to previous |
| Mid January – February | Winter | Latter half | Second period | Advance to subsequent | | Advance to subsequent |
| March – May | Spring | — | | | Return to previous | — |
| June – Mid July | Summer | First half | First period | — | | Return to previous |
| Mid July – August | Summer | Latter half | | | Advance to subsequent | Advance to subsequent |
| September – November | Autumn | — | | Return to previous | | — |

CONTENT PLAYBACK DEVICE, CONTENT PLAYBACK METHOD, AND RECORDING MEDIUM

CROSS REFERENCE TO RELATED APPLICATIONS

This is a continuation application of PCT International Application No, PCT/JP2022/016040 filed on Mar. 30, 2022, designating the United States of America, which is based on and claims priority of Japanese Patent Application No. 2021092129 filed on Jun. 1, 2021, and Japanese Patent Application No, 2021-108015 filed on Jun. 29, 2021. The entire disclosures of the above-identified applications, including the specifications, drawings and claims are incorporated herein by reference in their entirety.

FIELD

The present disclosure relates to a content playback device, a content playback method, and a recording medium.

BACKGROUND

Patent Literature (PTL) 1 discloses a device that detects atmospheric pressure with an atmospheric pressure sensor and selects and plays back a melody according to the weather predicted from the atmospheric pressure. With this configuration, a melody selected to image each type of weather is played back, thus making the weather forecast known.

CITATION LIST

Patent Literature

PTL 1: Japanese Unexamined Patent Application Publication No. 5-27048

SUMMARY

Technical Problem

The present disclosure provides a content playback device capable of playing back content corresponding to a perceived temperature for a person.

Solution to Problem

A content playback device according to the present disclosure includes: a communication interface that receives perceived temperature information from an external device via a communication network, the perceived temperature information being information indicating a temperature perceived by a person in a specific area at current time; storage that stores date information indicating a current date and the perceived temperature information; and a controller that causes the storage to store the perceived temperature information received by the communication interface, selects playback content from a plurality of pieces of content, based on the date information and the perceived temperature information, and outputs the playback content.

Note that these general or specific aspects may be realized in a system, method, integrated circuit, computer program, or non-transitory recording medium such as a computer-readable compact disc read-only memory (CD-ROM), or may be realized in any combination of the system, method, integrated circuit, computer program, and non-transitory recording medium.

Advantageous Effects

The content playback device according to the present disclosure is capable of playing back content corresponding to a perceived temperature for a person.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a diagram illustrating an example of a correspondence relationship between weather and content according to the embodiment.

FIG. 4 is a diagram illustrating an example of a correspondence relationship between precipitation and content according to the embodiment.

FIG. 5 is a diagram illustrating an example of a correspondence relationship between seasons and content according to the embodiment.

FIG. 7 is a flowchart illustrating an example of a playback content selection process according to the embodiment.

FIG. 8A is a flowchart illustrating an example of the playback content selection process for the case other than rain or snow according to the embodiment.

FIG. 8B is a flowchart illustrating an example of the playback content selection process for the case other than rain or snow according to the embodiment.

FIG. 9 is a diagram illustrating an example of a correspondence relationship between dates and seasons according to the embodiment.

FIG. 10 is a diagram for explaining a method of adjusting first season information according to the embodiment.

DESCRIPTION OF EMBODIMENTS (Underlying Knowledge Forming Basis of the Present Disclosure)

In a year, seasonal changes are likely to be perceived in areas where temperatures change and organisms are active. In such areas, the season is identified by the time of year because the same season occurs at roughly the same time on an annual basis. However, a person may perceive the same season as hotter or colder than that season, depending on weather conditions. That is, there can be a discrepancy between the season that the person perceives and the season identified by the time of year.

Therefore, the inventors of the present invention have found a content playback device capable of playing back content corresponding to a perceived temperature for a person.

In the following, exemplary embodiment will be described in detail with reference to the drawings as appropriate. However, more detailed descriptions than necessary may be omitted. For example, a detailed description of a well-known matter or a duplicate description of a substantially identical configuration may be omitted. This is to avoid unnecessary redundancy in the following description and to facilitate the understanding of those skilled in the art.

Note that the accompanying drawings and the following description are provided to enable those skilled in the art to fully understand the present disclosure, and are not intended to limit the claimed subject matter.

Embodiment

In the following, an embodiment will be described with reference to FIGS. 1 to 10.

[1-1 Configuration]

Figure 1:
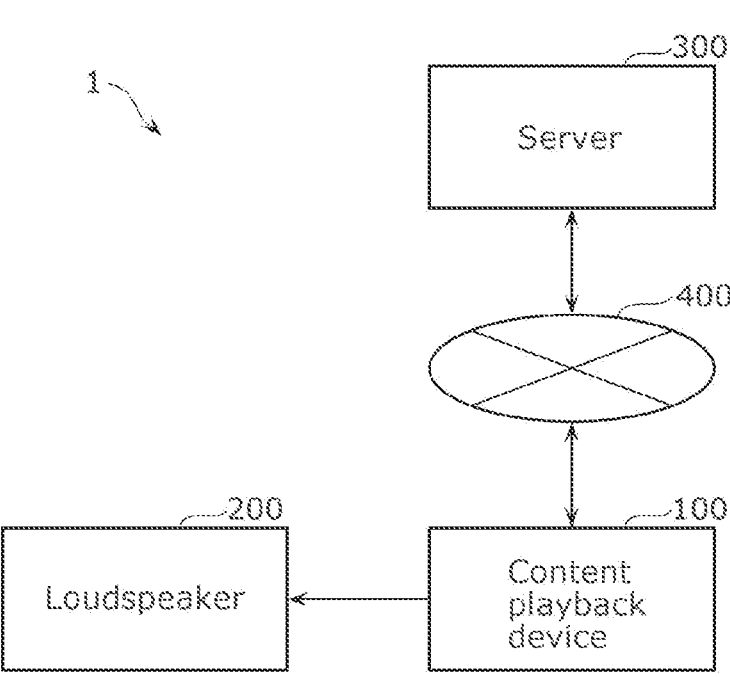
FIG. 1 is a diagram illustrating an example of a configuration of a content playback system according to an embodiment.

FIG. 1 is a diagram illustrating a configuration of a content playback system according to the embodiment. Content playback system 1 is provided with content playback device 100, loudspeaker 200, and server 300.

Content playback device 100 receives weather-related information related to weather from server 300, selects playback content, which is audio content to be played back based on the weather-related information, and outputs an audio signal included in the playback content to loudspeaker 200. The weather-related information is information related to at least one of the current weather or the weather forecast at a certain point. Details of the weather-related information will be described later.

Loudspeaker 200 plays back a sound based on the audio signal input from content playback device 100. Loudspeaker 200 and content playback device 100 are connected to each other by an audio cable, but may be connected by another cable such as an optical digital cable or a universal serial bus (USB) cable. Loudspeaker 200 may be configured integrally with content playback device 100. That is, loudspeaker 200 may be a built-in loudspeaker provided in content playback device 100. Loudspeaker 200 is an example of an output device that outputs content.

Server 300 holds weather-related information in internal storage. Server 300 transmits weather-related information related to weather in a specific area to content playback device 100 in response to a request from content playback device 100. The specific area is an area including a point where content playback device 100 is placed among a plurality of areas. Each of the plurality of areas is an area divided into a predetermined size. Content playback device 100 and server 300 are connected to each other via communication network 400.

Server 300 holds weather-related information in each of the plurality of areas. The weather-related information in each area includes weather information, precipitation information, and perceived temperature information.

The weather information is information indicating weather, such as sunny, cloudy, rain, or snow. When the weather information is information related to the weather forecast, the weather information may be in a format of a transition from sunny to cloudy or other formats.

The precipitation information is information indicating precipitation. When the weather information indicates weather other than that associated with rain or snow, the precipitation shall be 0 mm.

The perceived temperature information is information indicating a subjective temperature perceived by a person in each area, which is different from the actual temperature, and includes, for example, information such as "hot", "cold", and "just right". "Just right" is an example of a first perceived temperature indicating that the perceived temperature information is a comfortable temperature. "Hot" is an example of a second perceived temperature indicating that the perceived temperature information is a temperature that is hotter than being comfortable, that is, not comfortable. "Cold" is another example of the second perceived temperature indicating that the perceived temperature information is a temperature that is colder than being comfortable, that is, not comfortable.

Server 300 periodically acquires, from each of a plurality of terminals owned by a plurality of users living in each area, subjective information indicating a subjective temperature perceived by the user of the terminal. Using a predetermined algorithm and a plurality of pieces of subjective information acquired in the most recent period, server 300 identifies information indicating a subjective temperature predicted to be perceived by a majority of the plurality of users living in each area in that period as perceived temperature information. Therefore, server 300 holds the real-time perceived temperature information for each area.

Content playback system 1 is an example of a content playback system. Content playback device 100 is an example of a content playback device. Loudspeaker 200 is an example of a loudspeaker device. Server 300 is an example of a server device.

Figure 2:
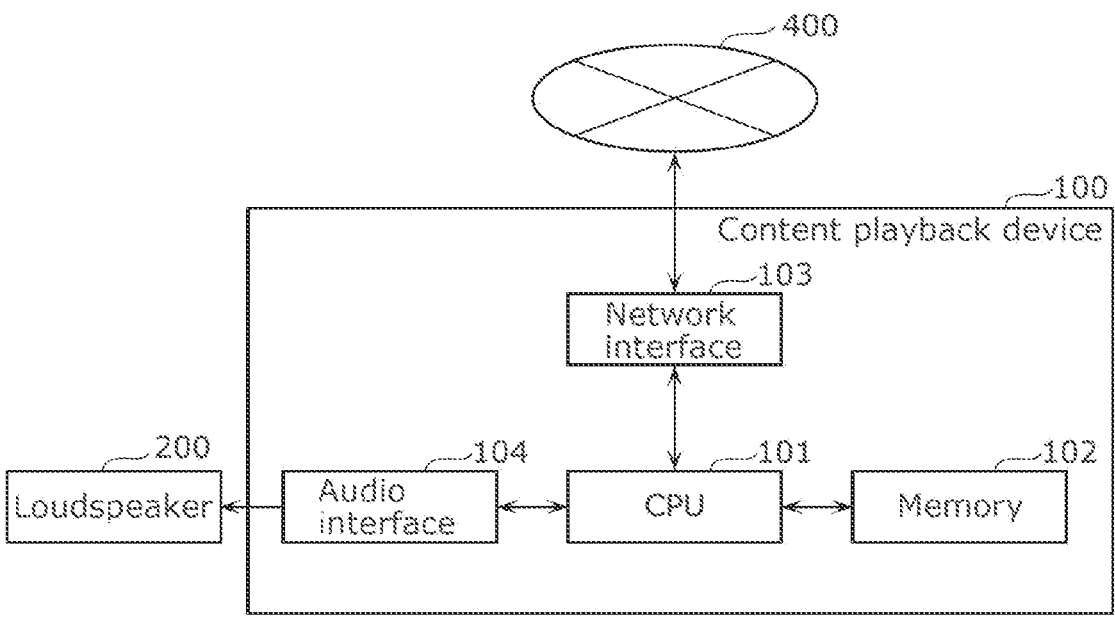
FIG. 2 is a block diagram illustrating an example of a configuration of a content playback device according to the embodiment.

FIG. 2 is a block diagram illustrating the configuration of the content playback device according to the embodiment. Content playback device 100 includes central processing unit (CPU) 101, memory 102, network interface 103, and audio interface 104.

Memory 102 is formed of a read-only memory (ROM), a random-access memory (RAM), or the like. Memory 102 is a storage medium (i.e., storage) for storing date information, a plurality of pieces of content, weather-related information received from server 300, and a program that is executed by CPU 101.

Network interface 103 is an interface for communicating with an external device such as server 300. Network interface 103 may be an interface for wireless communication, such as a wireless local area network (LAN) interface or a Bluetooth (registered trademark) interface. Network interface 103 may be an interface for wired communication such as a universal serial bus (USB) or a wired LAN interface. Note that network interface 103 is not limited to the above, and may be a communication interface for transmitting data to and from the external device via communication network 400.

Audio interface 104 is an interface that outputs an audio signal included in the content to loudspeaker 200.

CPU 101 realizes various functions by executing programs stored in memory 102. CPU 101 selects one piece of content from the plurality of pieces of content stored in memory 102 as the playback content based on the weather-related information and the date information, CPU 101 outputs the audio signal included in the selected playback content to loudspeaker 200 via audio interface 104.

The date information is information indicating the current date (year, month, and day). The date information may include the current time. CPU 101 constantly updates the date information to the current date and causes memory 102 to store the data information. The date information stored in memory 102 may be updated by a controller different from CPU 101.

Each of the plurality of pieces of content includes an audio signal. The audio signal included in each content may be an audio signal of music content, an audio signal of an environmental sound such as a song of a bird or an insect, a sound of rain, a sound of wind, or a silent audio signal. Each of the plurality of pieces of content may be classified into a plurality of types, FIG. 3 is a diagram illustrating an example of a correspondence relationship between weather and content according to the embodiment. For example, as illustrated in FIG. 3, each of the plurality of pieces of content may be classified in association with any one type of weather: sunny, cloudy, rain, or snow. The types of weather for classification may include those other than sunny, cloudy, rain, and snow, such as a transition from sunny to cloudy.

FIG. 4 is a diagram illustrating an example of a correspondence relationship between precipitation and content according to the embodiment. For example, rain content classified in association with rain among the plurality of pieces of content may be further classified in association with the precipitation, as illustrated in FIG. 4.

FIG. 5 is a diagram illustrating an example of a correspondence relationship between seasons and content according to the embodiment. For example, among the plurality of pieces of content, each sunny content, which is classified in association with other than rain or snow (i.e., sunny or cloudy), may be classified in association with any one of the four seasons of spring, summer, autumn, or winter, as illustrated in FIG. 5.

CPU 101 previously receives the plurality of pieces of content from the external device via communication network 400 and stores the content in memory 102. Note that CPU 101 may read the plurality of pieces of content from external storage connected to an external interface (not illustrated) and store the content in memory 102, or may receive the plurality of content by so-called streaming in which the content is sequentially received via communication network 400 during output to loudspeaker 200 to be described later.

CPU 101 also acquires weather-related information from server 300 and causes memory 102 to store the weather-related information.

Server 300 holds weather-related information for each point. Content playback device 100 previously holds, in memory 102, point information related to a point where content playback device 100 is placed, CPU 101 of content playback device 100 transmits the point information to server 300 and requests the acquisition of the weather-related information. In response to the request, server 300 transmits the weather-related information corresponding to the point information, received from content playback device 100, to content playback device 100. In this manner, content playback device 100 acquires the weather-related information corresponding to the stored point information. Note that CPU 101 of content playback device 100 may receive weather-related information for all points from server 300, and then identify the weather-related information corresponding to the point information and store the weather-related information in memory 102.

CPU 101 is an example of a controller. Memory 102 is an example of storage. Network interface 103 is an example of a communication interface. Network interface 103 is an example of an input interface. Audio interface 104 is an example of an output interface.

[1-2 Operation]

The operation of content playback device 100 configured in the above manner will be described below.

Figure 6:
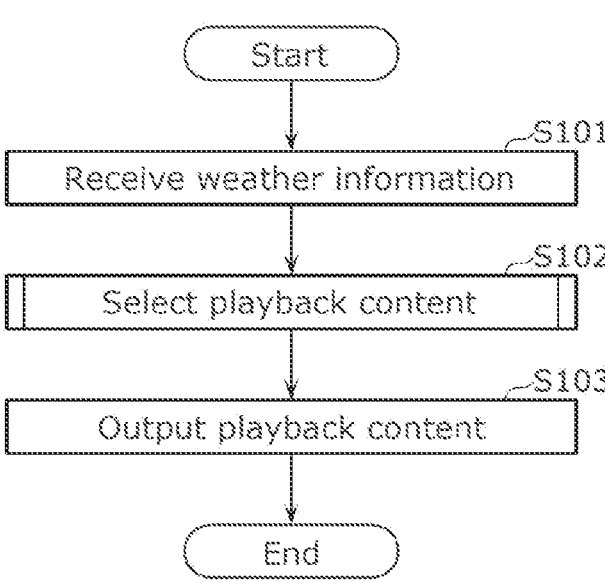
FIG. 6 is a flowchart illustrating an example of the operation of the content playback device according to the embodiment.

FIG. 6 is a flowchart illustrating an example of the operation of content playback device 100 according to the embodiment.

CPU 101 executes the process illustrated in the flowchart of FIG. 6 at regular time intervals (for example, every 30 minutes).

Network interface 103 of content playback device 100 receives weather-related information corresponding to point information for a point where content playback device 100 is placed from server 300 via communication network 400 (S101). Thereby, CPU 101 acquires the weather-related information in the specific area.

Next, CPU 101 determines (selects) one piece of content from the plurality of pieces of content stored in memory 102 as playback content based on the weather-related information and date information indicating the current date (S102).

Next, CPU 101 outputs the audio signal included in the selected playback content to loudspeaker 200 (S103).

Next, a playback content selection process in step S102 will be described.

Figure 7:
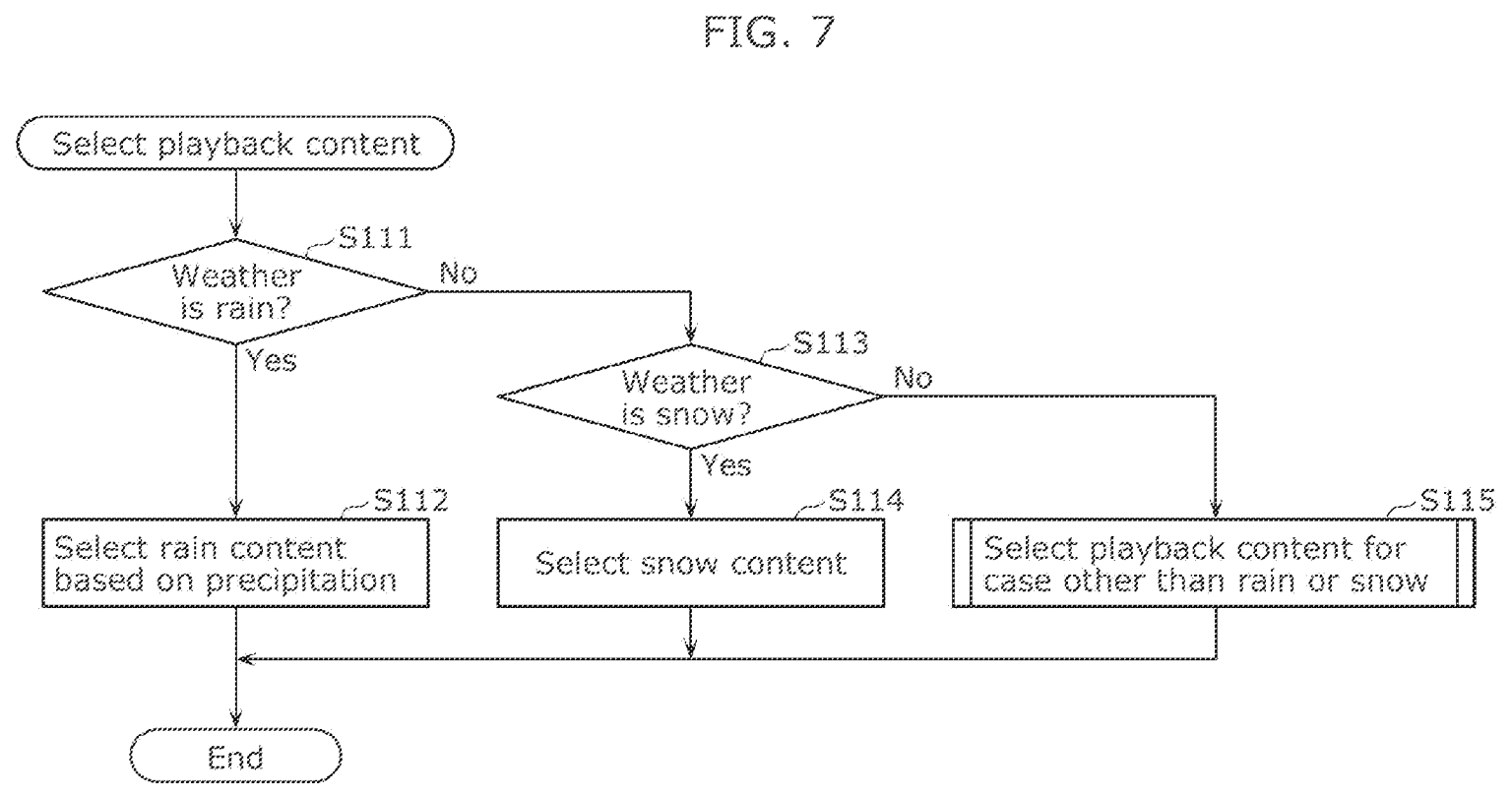

FIG. 7 is a flowchart illustrating an example of the playback content selection process (step S102) according to the embodiment.

CPU 101 acquires weather information from the read weather-related information and determines whether or not the weather indicated by the weather information is rain (S111).

Upon determining that the weather indicated by the weather information is rain (Yes in S111), CPU 101 acquires precipitation information from the read weather-related information and selects rain content according to the precipitation information (S112). Here, in the present embodiment, "the weather indicated by the weather information is rain" includes cases where the weather is rain, a transition from sunny to cloudy, a transition from rain to cloudy, storm, thunder, sleet, or the like. CPU 101 selects content corresponding to precipitation by referring to the table illustrated in FIG. 4 and sets the content as playback content. For example, when the precipitation indicated by the precipitation information is 5 mm, CPU 101 selects rain content 2.

Upon determining that the weather indicated by the weather information is not rain (No in S111), CPU 101 determines whether or not the weather indicated by the weather information is snow (S113).

Upon determining that the weather indicated by the weather information is snow (Yes in S113), CPU 101 selects snow content (S114). Here, in the present embodiment, "the weather indicated by the weather information is snow" includes cases where the weather is snow, a transition from snow to sunny, a transition from snow to cloudy, heavy snow, or the like. The audio signal included in the snow content may be a silent audio signal.

Upon determining that the weather indicated by the weather information is not snow (No in S113), CPU 101 determines the content by a process to be described later (S115). That is, upon determining that the weather indicated by the weather information is neither rain nor snow, CPU 101 executes the process of step S115.

Upon determining that the weather indicated by the weather information is neither rain nor snow, CPU 101 identifies a season as first season information based on the date indicated by the date information. Next, CPU 101 identifies second season information by adjusting the first season information based on perceived temperature information included in the weather-related information, and selects the playback content based on the second season information. The detailed flow of the process will be described below.

Figure 8A:
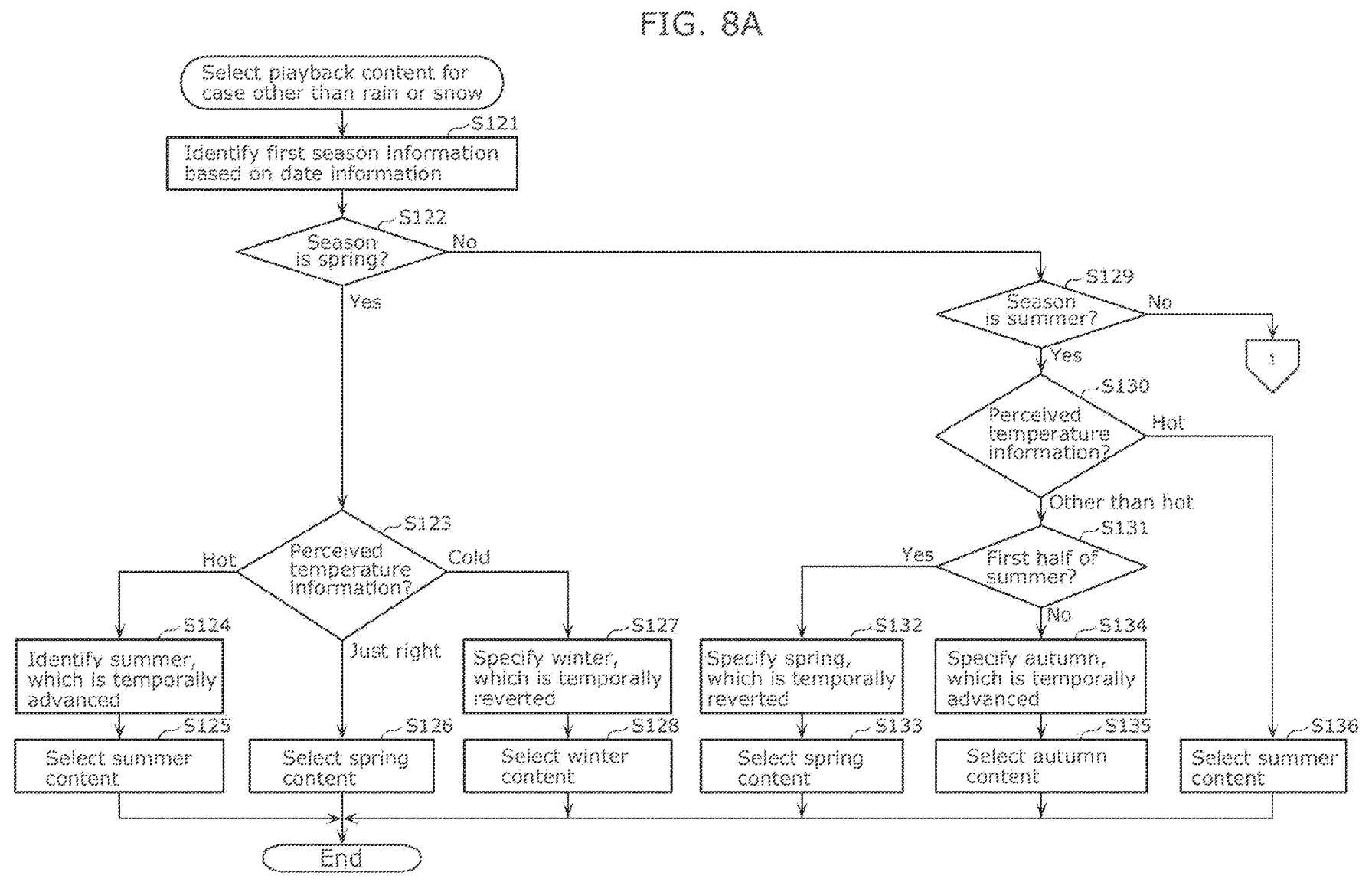
Figure 8B:
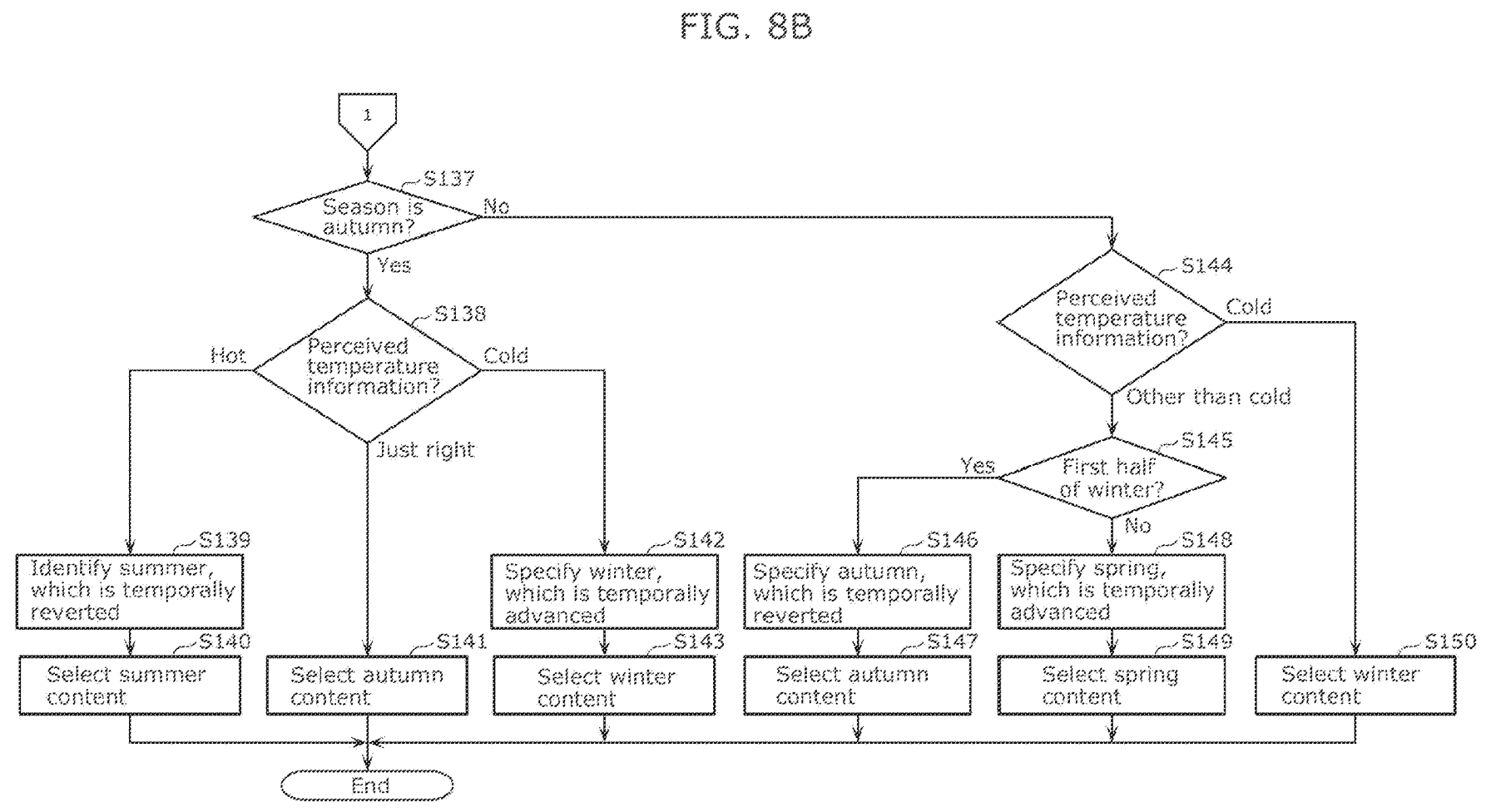

FIGS. 8A and 8B are flowcharts illustrating the flow of the playback content selection process (the process of step S115) for the case other than rain or snow according to the embodiment.

CPU 101 reads and acquires the date information stored in memory 102 and identifies the season corresponding to the date information as the first season information (S121).

FIG. 9 is a diagram illustrating a correspondence relationship between the dates indicated by the date information and the seasons. CPU 101 refers to the table illustrated in FIG. 9 and identifies the season corresponding to the date indicated by the date information as the first season information. In the present embodiment, when the season is summer or winter, CPU 101 refers to the table illustrated in FIG. 9 and further identifies whether the season (summer or winter) is its first half or latter half. For example, when the date indicated by the date information is June 1, CPU 101 identifies that the season is summer and the first half of summer as the first season information.

Next, CPU 101 identifies the adjusted second season information based on the identified first season information and the perceived temperature information included in the weather-related information, and selects the playback content. CPU 101 determines a temporal direction in which the first season information is adjusted based on whether or not the date information is included within a predetermined range of a year, identifies the second season information by adjusting the first season information based on the perceived temperature information, and selects the playback content based on the second season information. The temporal direction in which the first season information is adjusted includes a direction of advancing the season and a direction of reverting the season. Here, "advancing the season" means that when seasons are arranged to cycle in chronological order, such as spring, summer, autumn, winter, spring, summer, . . . , a later season is selected in this sequence order. Further, "reverting the season" means that when seasons are arranged to cycle in chronological order, such as spring, summer, autumn, winter, spring, summer, . . . , an earlier season is selected in this sequence order. Specifically, by executing the processes of steps S122 to S150 to be described later, CPU 101 identifies the adjusted second season information and selects the playback content based on the second season information, FIG. 10 is a diagram for explaining a method of adjusting the first season information according to the embodiment. In the following, with reference to FIG. 10, an example of the process for realizing the processes of steps S122 to S150 to be described later will be described.

When the perceived temperature information indicates "hot", and the current date is included in the first period of the year, which includes the latter half of summer through the first half of winter, CPU 101 identifies a season that is temporally reverted from the first season information within the limit of the first period as the second season information. For example, when the perceived temperature information indicates "hot", and the current date is included in the first period, if the first season information is summer, and the period is the latter half, CPU 101 identifies summer as the second season information because the first period, starting from the latter half of summer, is the limit. For example, when the perceived temperature information indicates "hot", and the current date is included in the first period, if the first season information is autumn, CPU 101 identifies summer as the second season information, which is one season reverted from autumn. For example, when the perceived temperature information indicates "hot", and the current date is included in the first period, if the first season information is winter, and the period is the first half, CPU 101 identifies autumn as the second season information, which is one season reverted from winter.

When the perceived temperature information indicates "hot", and the current date is included in the second period of the year, which includes the latter half of winter through the first half of summer, CPU 101 identifies a season that is temporally advanced from the first season information within the limit of the second period as the second season information. For example, when the perceived temperature information indicates "hot", and the current date is included in the second period, if the first season information is winter, and the period is the latter half, CPU 101 identifies spring as the second season information, which is one season advanced from winter. For example, when the perceived temperature information indicates "hot", and the current date is included in the second period, if the first season information is spring, CPU 101 identifies summer as the second season information, which is one season advanced from spring. For example, when the perceived temperature information indicates "hot", and the current date is included in the second period, if the first season information is summer, and the period is the first half, CPU 101 identifies summer as the second season information because the first period, ending in the first half of summer, is the limit.

Note that the first period is a period in which temperatures (for example, daily average temperature, maximum temperature, minimum temperature, and weekly moving average temperature) tend to decrease as the date advances. The second period is a period in which temperatures (for example, daily average temperature, maximum temperature, minimum temperature, and weekly moving average temperature) tend to increase as the date advances.

When the perceived temperature information indicates "cold", and the current date is included in the first period of the year, which includes the latter half of summer through the first half of winter, CPU 101 identifies a season that is temporally advanced from the first season information within the limit of the first period as the second season information. For example, when the perceived temperature information indicates "cold", and the current date is included in the first period, if the first season information is summer, and the period is the latter half, CPU 101 identifies autumn as the second season information, which is one season advanced from summer. For example, when the perceived temperature information indicates "cold", and the current date is included in the first period, if the first season information is autumn, CPU 101 identifies winter as the second season information, which is one season advanced from autumn. For example, when the perceived temperature information indicates "cold", and the current date is included in the first period, if the first season information is winter, and the period is the first half, CPU 101 identifies winter as the second season information because the first period, ending in the first half of winter, is the limit.

When the perceived temperature information indicates "cold", and the current date is included in the second period of the year, which includes the latter half of winter through the first half of summer, CPU 101 identifies a season that is temporally reverted from the first season information within the limit of the second period as the second season information. For example, when the perceived temperature information indicates "cold", and the current date is included in the second period, if the first season information is winter, and the period is the latter half, CPU 101 identifies winter as the second season information because the second period, starting from the latter half of winter, is the limit. For example, when the perceived temperature information indicates "cold", and the current date is included in the second period, if the first season information is spring, CPU 101 identifies winter as the second season information, which is one season reverted from spring. For example, when the perceived temperature information indicates "cold", and the current date is included in the second period, if the first season information is summer, and the period is the first half, CPU 101 identifies spring as the second season information, which is one season reverted from summer.

As described above, when the perceived temperature information indicates the second perceived temperature (for example, hot) other than the comfortable first perceived temperature, CPU 101 determines different temporal directions, in which the seasons are adjusted, between the first period and the second period. When the perceived temperature information indicates the second perceived temperature (for example, hot) other than the comfortable first perceived temperature, and the current date indicated by the date information is included in the first period of the year, CPU 101 identifies one of a season that is temporally advanced from the first season information or a season that is temporally reverted from the first season information as the second season information. When the perceived temperature information indicates a second perceived temperature (for example, hot) other than the comfortable first perceived temperature, and the current date indicated by the date information is included in the second period of the year, which is different from the first period, CPU 101 identifies the other of the season that is temporally advanced from the first season information or the season that is temporally reverted from the first season information as the second season information.

When the perceived temperature information indicates "just right", and the current date is included in the first half of summer or the first half of winter, CPU 101 identifies a season that is temporally reverted from the first season information as the second season information. For example, when the perceived temperature information indicates "just right", and the current date is included in the first half of summer, CPU 101 identifies spring as the second season information, which is one season reverted from summer, because the first season information is summer. For example, when the perceived temperature information indicates "just right", and the current date is included in the first half of winter, CPU 101 identifies autumn as the second season information, which is one season reverted from winter, because the first season information is winter.

When the perceived temperature information indicates "just right", and the current date is included in the latter half of summer or the latter half of winter, CPU 101 identifies a season that is temporally reverted from the first season information as the second season information. For example, when the perceived temperature information indicates "just right", and the current date is included in the latter half of summer, CPU 101 identifies autumn as the second season information, which is one season advanced from summer, because the first season information is summer. For example, when the perceived temperature information indicates "just right", and the current date is included in the latter half of winter, CPU 101 identifies spring as the second season information, which is one season advanced from winter, because the first season information is winter.

The description now returns to FIG. 8A

CPU 101 determines whether or not the first season information identified in step S121 is spring (S122).

Upon determining that the first season information is spring (Yes in S122), CPU 101 acquires the perceived temperature information from the read weather-related information, and determines whether the perceived temperature information indicates "hot", "just right", or "cold" (S123).

Next, when the perceived temperature information indicates "hot" ("Hot" in S123), CPU 101 identifies summer, which is one season advanced from spring that is the season identified as the first season information, as the second season information (S124).

Then, CPU 101 selects the summer content corresponding to summer (S125), and ends the process.

When the perceived temperature information indicates "just right" ("Just right" in S123), CPU 101 selects the spring content corresponding to spring, which was identified as the first season information (S126), and ends the process. In this case, CPU 101 may identify spring, which is the season identified as the first season information, as the second season information and select the spring content corresponding to spring that is the second season information.

When the perceived temperature information indicates "cold" ("Cold" in S123), CPU 101 identifies winter, which is one season reverted from spring that is the season identified as the first season information, as the second season information (S127).

Then, CPU 101 selects the winter content corresponding to winter (S128), and ends the process.

As described above, in the processes of steps S122 to S128, upon determining that the season indicated by the date information is spring, CPU 101 determines to advance the season by one when the perceived temperature information indicates "hot", or to revert the season by one when the perceived temperature information indicates "cold", as the direction in which the first season information is adjusted. Then, CPU 101 adjusts the first season information according to this determination based on the perceived temperature information, thereby identifying the second season information.

Upon determining that the first season information is not spring (No in S122), CPU 101 determines whether or not the first season information is summer (S129).

Upon determining that the first season information is summer (Yes in S129), CPU 101 acquires the perceived temperature information from the read weather-related information, and determines whether the perceived temperature information indicates "hot", "just right", or "cold" (S130).

Next, when the perceived temperature information indicates "hot" ("Hot" in S130), CPU 101 selects the summer content corresponding to summer, which was identified as the first season information (S136), and ends the process. In this case, CPU 101 may identify summer, which is the season identified as the first season information, as the second season information and select the summer content corresponding to summer that is the second season information.

When the perceived temperature information indicates other than "hot" ("Other than hot" in S130), CPU 101 determines whether or not the first season information is summer, and the period is the first half, that is, the season is the first half of summer (S131). Note that 'the perceived temperature information indicates other than "hot"' means that the perceived temperature information indicates "just right" or "cold".

Upon determining that the season is the first half of summer (Yes in S131), CPU 101 identifies spring, which is one season reverted from summer that is the season identified as the first season information, as the second season information (S132).

Then, CPU 101 selects the spring content corresponding to spring (S133).

Upon determining that the season is the latter half of summer (No in S131), CPU 101 identifies autumn, which is one season advanced from summer that is the season identified as the first season information, as the second season information (S134).

Then, CPU 101 selects the autumn content corresponding to autumn (S135).

When the perceived temperature information indicates "just right" other than "hot" in step S130, spring or autumn, which is a season cooler than summer, is identified as the second season information, similarly to when the perceived temperature information indicates "cold". This is because when the perceived temperature information indicates "just right", it is presumed that it is not hot even though the season is summer, that is, the user perceives cool and not summery.

Next, the description will move on to FIG. 8B.

Upon determining that the first season information is not summer (No in S129), CPU 101 determines whether or not the first season information is autumn (S137).

Upon determining that the first season information is autumn (Yes in S137), CPU 101 acquires the perceived temperature information from the read weather-related information, and determines whether the perceived temperature information indicates "hot", "just right", or "cold" (S138).

Next, when the perceived temperature information indicates "hot" ("Hot" in S138), CPU 101 identifies summer, which is one season reverted from autumn that is the season identified as the first season information, as the second season information (S139).

Then, CPU 101 selects the summer content corresponding to summer (S140), and ends the process.

When the perceived temperature information indicates "just right" ("Just right" in S138), CPU 101 selects the autumn content corresponding to autumn, which was identified as the first season information (S141), and ends the process. In this case, CPU 101 may identify autumn, which is the season identified as the first season information, as the second season information and select the autumn content corresponding to autumn that is the second season information.

When the perceived temperature information indicates "cold" ("Cold" in S138), CPU 101 identifies winter, which is one season advanced from autumn that is the season identified as the first season information, as the second season information (S142).

Then, CPU 101 selects the winter content corresponding to winter (S143), and ends the process.

As described above, in the processes of steps S137 to S143, upon determining that the season indicated by the date information is autumn, CPU 101 determines to revert the season by one when the perceived temperature information indicates "hot", or to advance the season by one when the perceived temperature information indicates "cold", as the direction in which the first season information is adjusted. Then, CPU 101 adjusts the first season information according to this determination based on the perceived temperature information, thereby identifying the second season information.

Upon determining that the first season information is not autumn (No in S137), CPU 101 determines that the first season information is winter.

Next, CPU 101 acquires the perceived temperature information from the read weather-related information, and determines whether the perceived temperature information indicates "hot", "just right", or "cold" (S144).

When the perceived temperature information indicates "cold" ("Cold" in S144), CPU 101 selects the winter content corresponding to winter, which was identified as the first season information (S150), and ends the process. In this case, CPU 101 may identify winter, which is the season identified as the first season information, as the second season information and select the winter content corresponding to winter that is the second season information.

When the perceived temperature information indicates other than "cold" ("Other than cold" in S144), CPU 101 determines whether or not the first season information is winter, and the period is the first half, that is, the season is the first half of winter (S145).

Upon determining that the season is the first half of winter (Yes in S145), CPU 101 identifies autumn, which is one season reverted from winter that is the season identified as the first season information, as the second season information (S146).

Then, CPU 101 selects the autumn content corresponding to autumn (S147).

Upon determining that the season is the latter half of winter (No in S145), CPU 101 identifies spring, which is one season advanced from winter that is the season identified as the first season information, as the second season information (S148).

Then, CPU 101 selects the spring content corresponding to spring (S149).

When the perceived temperature information indicates "just right" other than "cold" in step S144, spring or autumn, which is a season warmer than winter, is identified as the second season information, similarly to when the perceived temperature information indicates "hot". This is because when the perceived temperature information indicates "just right", it is presumed that it is not cold even though the season is winter, that is, the user perceives warm and not wintery.

As described above, CPU 101 identifies the first season information based on the date indicated by the date information, identifies the second season information by adjusting the first season information based on the perceived temperature information, and selects the playback content based on the second season information,

[1-3 Effects, Etc.]

As described above, in the present embodiment, content playback device 100 includes: network interface 103 that receives the current perceived temperature information for a person in a specific area from an external device via communication network 400; memory 102 that stores the perceived temperature information and date information indicating the current date; and CPU 101 that causes memory 102 to store the perceived temperature information received by network interface 103, selects playback content from a plurality of pieces of content, based on the perceived temperature information and the date information, and plays back the playback content.

It is thereby possible to output, as the playback content, optimal content corresponding to the temperature that the person physically perceives when going out into the external environment in the specific area at the present time. Thus, by outputting the playback content, it is possible to notify the person of the perceived temperature with less discomfort when the person goes out into the external environment.

In content playback device 100, CPU 101 identifies the first season information based on the current date, identifies the second season information by adjusting the first season information based on the perceived temperature information, and selects the playback content based on the second season information.

It is thereby possible to output, as the playback content, optimal content corresponding to the season that the person physically perceives when going out into the external environment in the specific area at the present time. Thus, by outputting the playback content, it is possible to notify the person of the perceived season with less discomfort when the person goes out into the external environment.

In content playback device 100, when the perceived temperature information indicates the second perceived temperature other than the comfortable first perceived temperature, and when the current date indicated by the date information is included in the first period of the year, CPU 101 identifies one of a season that is temporally advanced from the first season information or a season that is temporally reverted from the first season information as the second season information. When the perceived temperature information indicates the second perceived temperature other than the comfortable first perceived temperature, and the current date indicated by the date information is included in the second period of the year, which is different from the first period, CPU 101 identifies the other of the season that is temporally advanced from the first season information or the season that is temporally reverted from the first season information as the second season information.

Therefore, it is possible to identify an appropriate season as the second season information indicating the perceived season when the playback content is selected.

In content playback device 100, the first period is a period including the latter half of summer through the first half of winter, and the second period is a period including the latter half of winter through the first half of summer. When the current date is included in the first period, if the second perceived temperature is a temperature that is perceived hotter than the first perceived temperature, CPU 101 identifies a season that is temporally reverted from the first season information within the limit of the first period as the second season information. When the current date is included in the second period, if the second perceived temperature is a temperature that is perceived hotter than the first perceived temperature, CPU 101 identifies a season that is temporally advanced from the first season information within the limit of the second period as the second season information.

Therefore, it is possible to identify an appropriate season as the second season information indicating the perceived season when the playback content is selected.

In content playback device 100, the first period is a period including the latter half of summer through the first half of winter, and the second period is a period including the latter half of winter through the first half of summer. When the current date is included in the first period, if the second perceived temperature is a temperature that is perceived colder than the first perceived temperature, CPU 101 identifies a season that is temporally advanced from the first season information within the limit of the first period as the second season information. When the current date is included in the second period, if the second perceived temperature is a temperature that is perceived colder than the first perceived temperature, CPU 101 identifies a season that is temporally reverted from the first season information within the limit of the second period as the second season information.

Therefore, it is possible to identify an appropriate season as the second season information indicating the perceived season when the playback content is selected.

In content playback device 100, when the perceived temperature information indicates the comfortable first perceived temperature, and the current date is included in the first half of summer or the first half of winter, CPU 101 identifies a season that is temporally reverted from the first season information as the second season information. When the perceived temperature information indicates the comfortable first perceived temperature, and the current date is included in the latter half of summer or the latter half of winter, CPU 101 identifies a season that is temporally advanced from the first season information as the second season information.

Therefore, it is possible to identify an appropriate season as the second season information indicating the perceived season when the playback content is selected.

In content playback device 100, each of the plurality of pieces of content is classified in association with any one of the four seasons of spring, summer, autumn, or winter. CPU 101 selects content classified in association with the season indicated by the second season information among the plurality of pieces of content as the playback content. Therefore, it is possible to select, as the playback content, content classified in association with the season corresponding to the perceived temperature for the person among the pieces of content each classified in association with any one of the four seasons of spring, summer, autumn, or winter.

In content playback device 100, network interface 103 further receives weather information related to the weather in the specific area. CPU 101 causes memory 102 to store the weather information. When the weather information indicates either rain or snow, CPU 101 selects, as the playback content, content corresponding to one of rain or snow indicated by the weather information from the plurality of pieces of content. When the weather information indicates other than rain or snow, CPU 101 selects the playback content from the plurality of pieces of content, based on the date information and the perceived temperature information.

Therefore, it is possible to output optimal content corresponding to the weather as the playback content. In the case of the weather other than rain or snow, it is possible to output, as the playback content, optimal content corresponding to the temperature that the person physically perceives when going out into the external environment in the specific area at the present time.

OTHER EMBODIMENTS

The above embodiment has been described as an example of the technology disclosed in the present application. However, the technology according to the present disclosure is not limited thereto, and can be applied to embodiments in which modifications, substitutions, additions, omissions, and the like are made as appropriate. Further, the components described in the above embodiment can be combined to form a new embodiment. Therefore, other embodiments will be illustrated below.

In the above embodiment, the configuration has been described in which content playback device 100 selects playback content from a plurality of pieces of content, based on date information and perceived temperature information, and outputs an audio signal included in the playback content.

That is, an example in which the playback content includes an audio signal has been described, but the playback content may include a video signal. The content playback device of the present disclosure may be configured to output a video signal included in the selected playback content, or may be configured to output a video signal and an audio signal included in the selected playback content. That is, in the content playback system of the present disclosure, each of the plurality of pieces of content includes a video signal. The content playback device is provided with a video interface. The video interface is an interface that outputs a video signal to an external display. The CPU outputs the video signal included in the selected playback content to the display via the video interface. The display may be integrated with the content playback device.

The playback content may include a control signal for controlling the operation of an aroma output device that outputs one of a plurality of types of aromas. The content playback device of the present disclosure may be configured to output a control signal for causing the aroma output device to perform an operation to emit one aroma as the selected playback content. That is, in the content playback system of the present disclosure, each of the plurality of pieces of content includes a control signal. The content playback device is provided with an output interface. The output interface is an interface that outputs a control signal to the external aroma output device. The CPU outputs the control signal included in the selected playback content to the aroma output device via the output interface. The aroma output device is provided with a plurality of tanks containing original liquids of a plurality of types of aromas, and an atomizer that is provided in each of the plurality of tanks and sprays the liquid from the tank, or a valve that communicates the tank with a space outside the aroma output device. The aroma output device receives the control signal and controls the atomizer or valve of one of the plurality of tanks corresponding to the received control signal to emit the aroma of the tank into the external space. The plurality of tanks may include six tanks of a rain aroma, a snow aroma, a spring aroma, a summer aroma, an autumn aroma, and a winter aroma.

In the above embodiment, as an example, the configuration has been described in which the weather indicated by the weather information is classified in association with the categories of rain, snow, or the case other than rain or snow, and the content is selected according to this classification. However, the content playback device of the present disclosure may perform another classification using the acquired weather information and select the content. For example, the content playback device may classify the weather indicated by the weather information in association with categories of sunny, cloudy, rain, sleet, or snow, and select the content accordingly.

In the above embodiment, as an example, when the weather indicated by the weather information is rain, the content is selected according to the precipitation indicated by the precipitation information by applying the table of the precipitation and content in FIG. 4. However, the content playback device of the present disclosure may freely determine the content of the table of the precipitation and content. For example, the table may be set as follows: rain content 1 for the case of 10 mm or less, rain content 2 for the case of more than 10 mm and less than 20 mm, and rain content 3 for the case of more than 20 mm.

In the above embodiment, when the weather indicated by the weather information is rain, the content has been selected according to the precipitation indicated by the precipitation information by applying the table of the precipitation and content in FIG. 4. However, the content playback device of the present disclosure may select one piece of rain content when the weather indicated by the weather information is rain, and may control the playback volume of the audio signal included in the rain content according to the precipitation indicated by the precipitation information, more specifically, may control the playback volume of the audio signal so as to increase as the precipitation indicated by the precipitation information increases.

In the above embodiment, as an example, the configuration has been described in which the perceived temperature information is classified into any one of the categories of "hot", "just right", and "cold", and the content is selected according to this classification. However, the content playback device of the present disclosure may include other categories as the perceived temperature information to be acquired. For example, the perceived temperature information may include "extremely hot", "hot", "warm", "cool", "cold", and "extreme cold", and the content playback device may select the content accordingly.

In the above embodiment, as an example, the season is identified from the date information among spring, summer, fall, and winter, and is adjusted according to the perceived temperature information, and the playback content is selected according to the adjusted season. The content playback device of the present disclosure may adjust the date information based on the perceived temperature information, identify the adjusted date information, and select the playback content from the plurality of pieces of content, based on the date indicated by the adjusted date information. For example, when the date indicated by the date information is February 1, and the perceived temperature information is "cold", the content playback device may leave the date information as it is and select the winter content corresponding to February 1. When the date indicated by the date information is February 1, and the perceived temperature information is "other than cold" (for example, "just right" or "warm"), the content playback device may set the adjusted date to March 1 and select the spring content corresponding to March 1.

In the above embodiment, as an example, the season is identified from the date information among spring, summer, fall, and winter, and is adjusted according to the perceived temperature information, and the playback content is selected according to the adjusted season. However, the content playback device of the present disclosure may directly select the playback content according to the acquired date information and perceived temperature information, using a table with which the playback content can be uniquely determined from the date information and the perceived temperature information. For example, when the date indicated by the date information is February, and the perceived temperature information is "cold", the content playback device may select the winter content. When the date indicated by the date information is February, and the perceived temperature information is "other than cold", the content playback device may select spring.

In the above embodiment, as an example, the configuration has been described in which CPU 101 receives the plurality of pieces of content via communication network 400 and stores the received content in memory 102. However, the content playback device of the present disclosure may be configured to previously store the plurality of pieces of content in memory 102.

In the above embodiment, the configuration has been described in which content playback device 100, serving as an example of the content playback device, is formed of one device, and content playback device 100 includes the audio interface, the network interface, the memory, and the CPU. The content playback device may be formed of a plurality of devices. For example, a weather information acquisition device including a network interface, a memory, and a CPU, and a content playback device including an output interface, a network interface, a memory, and a CPU, may be connected. That is, the function of the content playback device may be divided, and the content playback device may be formed of a plurality of devices.

In the above embodiment, the weather-related information transmitted to content playback device 100 has been weather-related information related to weather of a specific area including a point where content playback device 100 is placed. However, the present invention is not limited thereto. The weather-related information transmitted to content playback device 100 may be weather-related information related to an area different from the area including the point where content playback device 100 is placed. Specifically, the weather-related information may be weather-related information related to an area preset by the user. For example, even when content playback device 100 is placed in Osaka, if the area of the weather-related information has been set to Tokyo by the user, server 300 transmits the weather-related information of Tokyo to content playback device 100. This enables content playback device 100 to select and play back the content according to the current weather-related information of Tokyo, and the user can perceive the current weather of Tokyo in a simulated manner.

The embodiments have been described above as an example of the technology according to the present disclosure. To that end, the accompanying drawings and the detailed descriptions have been provided.

Accordingly, the components described in the attached drawings and the detailed descriptions may not only include components essential for solving the problem but also include, in order to illustrate the above technology, components that are not essential for solving the problem. Therefore, the fact that those non-essential components are described in the accompanying drawings and the detailed descriptions should not immediately lead to a finding that those non-essential components are essential.

The above embodiments are intended to illustrate the technology according to the present disclosure, and hence various modifications, substitutions, additions, omissions, and the like can be made within the scope of the claims or equivalent ranges thereof.

INDUSTRIAL APPLICABILITY

The content playback device according to the present disclosure is effective for playing back content based on weather-related information.

The invention claimed is:

1. A content playback device comprising:
a communication interface that receives perceived temperature information from an external device via a communication network, the perceived temperature information being information indicating a temperature perceived by one or more persons in a specific area at current time;
storage that stores date information indicating a current date and the perceived temperature information; and
a controller that causes the storage to store the perceived temperature information received by the communication interface, selects, as playback content, content from a plurality of pieces of content, based on the date information and the perceived temperature information, and outputs the playback content,
wherein each of the plurality of pieces of content is classified in association with any one of a plurality of seasons, and
the controller:
identifies first season information based on the current date;
determines whether or not the perceived temperature information corresponds to the first season information;
when the controller determines that the perceived temperature information corresponds to the first season information, selects, as the playback content, content that is classified in association with a season indicated by the first season information from among the plurality of pieces of content;
when the controller determines that the perceived temperature information does not correspond to the first season information,
identifies second season information that indicates a different season that is temporally shifted from the season indicated by the first season information, and
selects, as the playback content, content that is classified in association with the different season indicated by the second season information from among the plurality of pieces of content.

2. The content playback device according to claim 1, wherein in a case where the perceived temperature information indicates a second perceived temperature other than a first perceived temperature, the first perceived temperature being comfortable, the controller:
when the current date is included in a first period of a year, identifies, as the second season information, a season that is temporally shifted in a first time direction from the season indicated by the first season information; and
when the current date is included in a second period of the year not overlapping the first period, identifies, as the second season information, a season that is temporally shifted in a second time direction from the season indicated by the first season information, and
the second time direction is a direction temporally opposite to the first time direction.

3. The content playback device according to claim 2, wherein the first period is a period including a latter half of summer through a first half of winter,
the second period is a period including a latter half of winter through a first half of summer, and
the controller:
identifies, as the second season information, a season that is temporally reverted from the first season information within a limit of the first period when the current date is included in the first period, if the second perceived temperature is a temperature that is perceived hotter than the first perceived temperature; and
identifies, as the second season information, a season that is temporally advanced from the first season information within a limit of the second period when the current date is included in the second period, if the second perceived temperature is a temperature that is perceived hotter than the first perceived temperature.

4. The content playback device according to claim 2, wherein the first period is a period including a latter half of summer through a first half of winter, the second period is a period including a latter half of winter through a first half of summer, and the controller:

identifies, as the second season information, a season that is temporally advanced from the first season information within a limit of the first period when the current date is included in the first period, if the second perceived temperature is a temperature that is perceived colder than the first perceived temperature; and identifies, as the second season information, a season that is temporally reverted from the first season information within a limit of the second period when the current date is included in the second period, if the second perceived temperature is a temperature that is perceived colder than the first perceived temperature.

5. The content playback device according to claim 2, wherein in a case where the perceived temperature information indicates the first perceived temperature that is comfortable, the controller:

identifies, as the second season information, a season that is temporally reverted from the first season information when the current date is included in the first half of summer or the first half of winter; and identifies, as the second season information, a season that is temporally advanced from the first season information when the current date is included in the latter half of summer or the latter half of winter.

6. The content playback device according to claim 1, wherein the controller identifies adjusted date information by adjusting the date information based on the perceived temperature information, and selects the playback content from the plurality of pieces of content, based on a date indicated by the adjusted date information.

7. The content playback device according to claim 1, wherein the communication interface further receives weather information related to weather in the specific area, and the controller:

causes the storage to store the weather information;

selects, as the playback content, content corresponding to one of rain or snow indicated by the weather information from the plurality of pieces of content when the weather information indicates one of rain or snow; and selects the playback content from the plurality of pieces of content, based on the date information and the perceived temperature information, when the weather information indicates weather other than rain or snow.

8. A content playback method comprising:

receiving perceived temperature information for one or more persons in a specific area from an external device via a communication network;

selecting, as a playback content, content from a plurality of pieces of content, based on date information indicating a current date and the perceived temperature information;

classifying each of the plurality of pieces of content in association with any one of a plurality of seasons;

identifying first season information based on the current date;

determining whether or not the perceived temperature information corresponds to the first season information;

when it is determined that the perceived temperature information corresponds to the first season information, selecting, as the playback content, content that is classified in association with a season indicated by the first season information from among the plurality of pieces of content;

when it is determined that the perceived temperature information does not correspond to the first season information, identifying second season information that indicates a different season that is temporally shifted from the season indicated by the first season information, and selecting, as the playback content, content that is classified in association with the different season indicated by the second season information from among the plurality of pieces of content; and outputting the playback content.

9. A non-transitory computer-readable recording medium having stored thereon a content playback program for causing a computer to execute the content playback method according to claim 8.

10. The content playback device according to claim 2, wherein the first perceived temperature is determined based on (i) a plurality of pieces of subjective information from a plurality of users that are present in a same area, and (ii) a category classified by using a predetermined algorithm, the plurality of users being the one or more persons, and the same area being the specific area, each of the plurality of pieces of subjective information indicates a subjective perceived temperature perceived by a corresponding one of the plurality of users; and the category is related to a level of a comfortability, the category being a category to which a representative perceived temperature of the plurality of users belongs.

* * * * *